(12) United States Patent
Barbieri et al.

(10) Patent No.: US 6,968,804 B1
(45) Date of Patent: Nov. 29, 2005

(54) DEVICE FOR DETECTING AND QUANTITATIVELY MEASURING THE EXPOSURE OF AN OBJECT TO A PREDETERMINED TEMPERATURE FOR A PREDETERMINED DURATION

(76) Inventors: Galdino Barbieri, 8, rue des Tartres, F-92500 Rueil-Malmaison (FR); Bruno De La Forterie, 23, avenue Victor Hugo, F-92500 Rueil-Malmaison (FR)

( * ) Notice: Subject to any disclaimer, the term of this patent is extended or adjusted under 35 U.S.C. 154(b) by 0 days.

(21) Appl. No.: 10/110,910

(22) PCT Filed: Aug. 7, 2000

(86) PCT No.: PCT/FR00/02263

§ 371 (c)(1),
(2), (4) Date: Sep. 3, 2002

(87) PCT Pub. No.: WO01/29525

PCT Pub. Date: Apr. 26, 2001

(30) Foreign Application Priority Data

Oct. 20, 1999 (FR) .................................. 99 13317

(51) Int. Cl.⁷ ........................ G01K 11/12; G01K 11/06
(52) U.S. Cl. ........................ 116/219; 374/106; 374/161
(58) Field of Search ........................ 116/206, 207, 216, 116/217, 218, 219; 374/161, 162, 160, 102, 374/103, 106

(56) References Cited

U.S. PATENT DOCUMENTS

| 3,414,415 | A | * | 12/1968 | Broad, Jr. .................... 116/219 |
| 3,420,205 | A | | 1/1969 | Morison |
| 3,479,877 | A | * | 11/1969 | Allen et al. .................. 374/106 |
| 3,954,011 | A | * | 5/1976 | Manske ....................... 374/102 |
| 3,961,530 | A | * | 6/1976 | Helgesson .................... 374/162 |
| 4,042,336 | A | * | 8/1977 | Larsson ........................ 422/58 |
| 4,280,361 | A | * | 7/1981 | Sala ........................... 116/216 |
| 4,353,990 | A | * | 10/1982 | Manske et al. ........... 435/287.4 |
| 4,382,700 | A | * | 5/1983 | Youngren .................... 374/102 |
| 4,432,656 | A | * | 2/1984 | Allmendinger ............. 374/102 |
| 5,120,137 | A | * | 6/1992 | Ou-Yang ..................... 374/106 |
| 5,295,297 | A | * | 3/1994 | Kitamura et al. ............. 29/827 |
| 5,602,804 | A | | 2/1997 | Haas |
| 5,709,472 | A | * | 1/1998 | Prusik et al. ................ 374/106 |
| 5,857,776 | A | * | 1/1999 | Blixt et al. ................... 374/106 |
| 5,875,892 | A | * | 3/1999 | Martin et al. .............. 206/459.1 |
| 6,042,264 | A | * | 3/2000 | Prusik et al. ................ 374/106 |
| 6,170,529 | B1 | * | 1/2001 | Howe ........................... 138/89 |
| 6,741,523 | B1 | * | 5/2004 | Bommarito et al. ........ 368/327 |
| 2002/0020686 | A1 | * | 2/2002 | Stull et al. ................... 215/230 |

FOREIGN PATENT DOCUMENTS

| DE | 1 648 263 | 11/1967 | |
| EP | 0 092 034 A2 | 2/1983 | |
| EP | 0 454 313 A2 | 10/1991 | |
| EP | 0 545 274 A1 | 6/1993 | |
| WO | WO 89/00680 | 1/1989 | ............ G01K 3/04 |

* cited by examiner

*Primary Examiner*—R. Alexander Smith
(74) *Attorney, Agent, or Firm*—Baker & Daniels LLP

(57) ABSTRACT

The inventive device comprises a housing (1) which is configured in the shape of a flat strip comprising an enclosure (6) on one side which projects outwards and contains a material (7) that changes its state or viscosity at a predetermined temperature. Said enclosure (6) opens onto the space inside the housing through a hole (8) which can be plugged with a tongue (9), this space inside the housing containing a strip (11) consisting of a porous material that is visible form the outside through holes made on the top surface (5) of the housing.

11 Claims, 3 Drawing Sheets

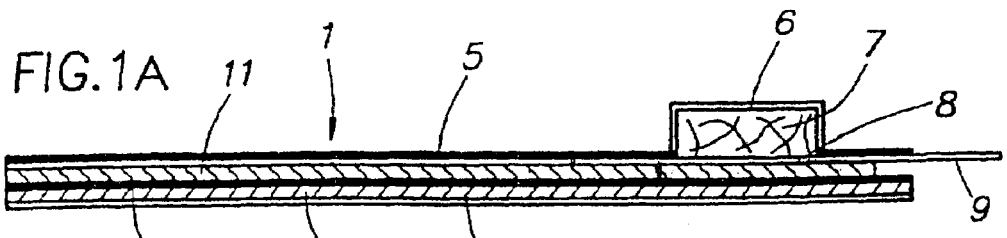
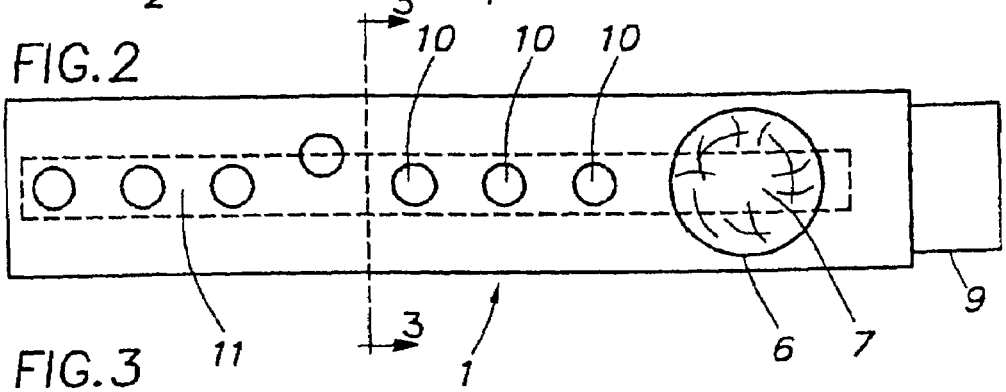
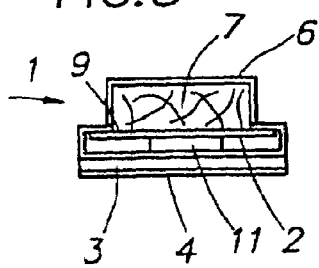
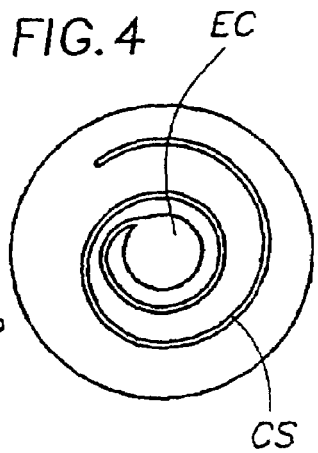
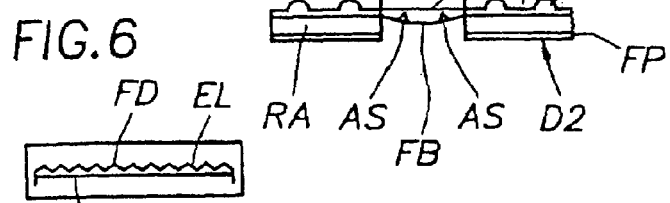
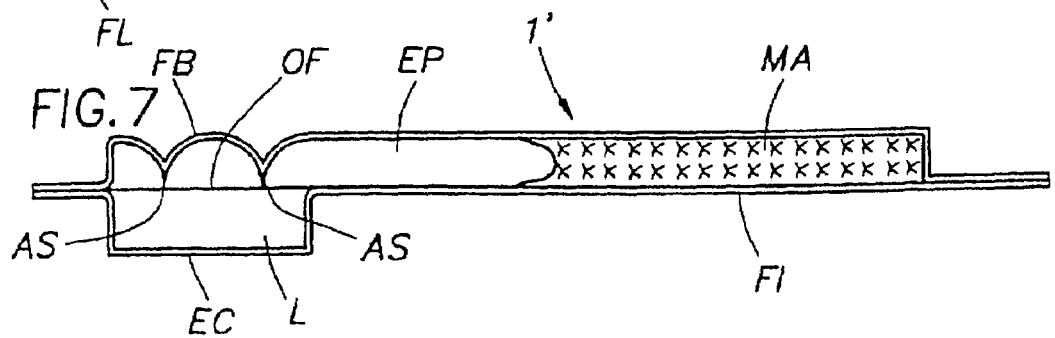

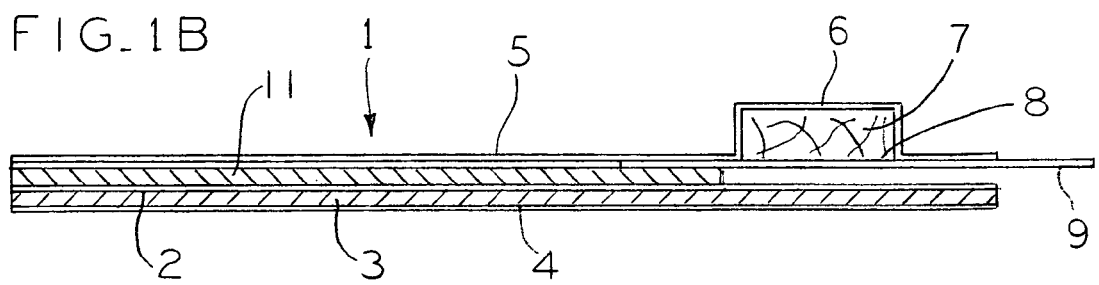

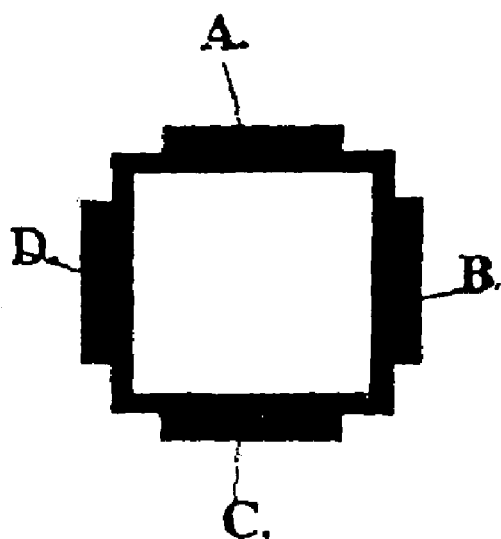
FIG. 8A
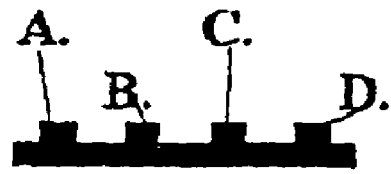
FIG. 8B
FIG. 9
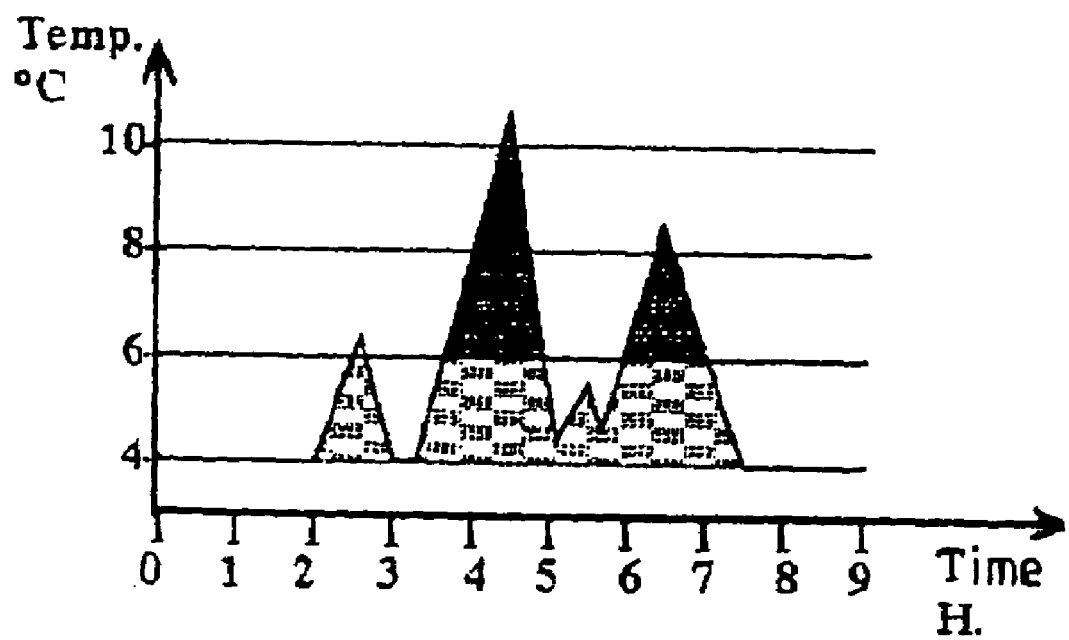

DEVICE FOR DETECTING AND QUANTITATIVELY MEASURING THE EXPOSURE OF AN OBJECT TO A PREDETERMINED TEMPERATURE FOR A PREDETERMINED DURATION

BACKGROUND OF THE INVENTION

The present invention concerns a device for detecting and quantitatively measuring the exposure of an object to a temperature at least equal to a predetermined temperature with account being taken of the duration of said exposure.

It applies especially, but not exclusively, to the checking of the integrity of the cold chain necessary for preserving certain objects or products, for example perishable foodstuffs, or even products for medical use, such as blood, vaccines or even temperature-sensitive medicines.

By way of example, it is known that a concentrate of red corpuscles can be preserved in a blood bank for forty-two days at a temperature of between +40° C. and +8° C. Once distributed by the blood transfusion service, this concentrate must be used very quickly if the ambient temperature exceeds +10° C. It is therefore important to know the moment when this temperature is exceeded and to measure for how long in order to know whether the concentrate is still usable.

A similar problem arises in the case of frozen products which must be preserved at a temperature of −30° C. and which, after de-frosting, must be consumed quickly.

Here again, it is important to detect whenever the preservation temperature is exceeded and, if necessary, the period for which it is exceeded, and the result of these two detections should be irreversible in character so that it can be ascertained long afterwards that the temperature has been exceeded as stated.

In an attempt to arrive at these results, electronic devices have already been proposed, employing a temperature measuring probe and a micro-controller making it possible both to detect when the temperature is exceeded and for how long. However, such a device proves too expensive to be used systematically on all the objects for which it is wished to monitor the temperature.

Attempts were also made to use temperature indicators employing fusible bodies changing state when a predetermined temperature is exceeded. These indicators, however, frequently inaccurate, do not take into account either by how much or for how long the temperature is exceeded, so that nothing makes it possible to indicate whether the object or the product remains usable or not.

The aim of the invention is therefore more particularly to eliminate these drawbacks by means of a device which detects the instances when the temperature is exceeded and which integrates into the time the amount by which the temperature is exceeded.

SUMMARY OF THE INVENTION

To this end, it proposes a device comprising an enclosure containing a material changing state or viscosity at a predetermined temperature, a propagation space connected to said enclosure, into which said material in the liquid state can spread at a predetermined speed, and means for displaying by transparency the progression of said material into said space.

Advantageously, the displacement of the material in the liquid state into said space may take place by capillary action either in capillary or laminar conduits, or in an absorbent material contained in said space.

In this case, the extent of this displacement will be variable according to the viscosity and the surface tension of the product, to the duration, to the temperature, and to the capacity or to the absorption power of the absorbent product.

The material may then consist of a product having a viscosity variable according to the temperature (for example an oil or a fat of animal, mineral, vegetable or synthetic nature) or even of a product changing state (solid/liquid) according to the temperature.

The absorbent product itself may consist of a porous material (chalk, absorbent paper, strip of fluorocarbonated material) or of a powdery material.

The display means may employ at least one window allowing viewing of the material spreading into the aforesaid space, said material being able to be either coloured so as to be observable directly, or opaque so as to mask an underlying surface, coloured or graduated if necessary, or of such a nature as to bring about a change of optical property of the absorbent material or of the capillary or laminar conduits, or of such a nature as to bring about a visible reaction within the absorbent material (turning of a reagent).

According to another feature of the invention, the aforesaid space may contain a substance dissolving progressively in contact with the material in a liquid state, means being provided to distinguish said material from said substance.

BRIEF DESCRIPTION OF THE DRAWINGS

Some embodiments of the invention will be described hereinafter by way of non-limiting example, with reference to the appended drawings, in which:

FIG. 1A shows a diagrammatic longitudinal sectional view of a detection device according to the invention;

FIG. 1B is another embodiment of the detection device of FIG. 1A.

FIG. 2 shows a diagrammatic plan view of the detection device of FIG. 1A;

FIG. 3 shows a diagrammatic cross-sectional view of the detection device of FIG. 1A taken along line 3—3 of FIG. 2;

FIG. 4 shows a diagrammatic plan view of a detector according to the invention which uses a spiral propagation space;

FIG. 5 shows a diagrammatic axial sectional view of the detector of FIG. 4;

FIG. 6 shows a diagrammatic cross-sectional view of a detector according to the invention illustrating the principle of a display device using a frosted surface;

FIG. 7 shows a diagrammatic longitudinal sectional view through an alternative embodiment of a detector according to the invention.

FIG. 8A shows a composite embodiment of a detector according to the invention including four identical detection devices;

FIG. 8B shows an elevational view of the detector of FIG. 8A; and

FIG. 9 discloses a graph illustrating the performance of the device of FIGS. 8A and 8B.

DESCRIPTION OF THE PREFERRED EMBODIMENT

In the example shown in FIG. 1, the principle of operation of the device is based on the following finding:

Certain products with viscosity variable according to the temperature (for example oil or fat of a mineral, vegetable or synthetic nature), or certain products which change state according to the temperature (liquids, crystals, etc.) placed in contact with an absorbent product (for example, absorbent paper, sugar, absorbent crystals, etc.) may undergo displacement by capillary action. This displacement is variable according to the viscosity and/or the surface tension of the product absorbed or to its state (liquid or solid), to the duration, to the temperature and to the capacity or to the absorption power of the absorbent product.

Certain absorbent products can change colour in contact with an absorbed product or conversely, certain absorbed products can change colour in contact with an absorbent product (for example, chemical reaction between an acid or basic body and a paper for measuring the pH).

Certain absorbed products can change colour according to the temperature.

Thus, for example at a low temperature, edible margarine which is in the solid state is not absorbed by absorbent paper. When the temperature is raised, the margarine liquefies and is absorbed by the absorbent paper. This absorption is progressive according to the duration, and the greater the absorption capacity of the absorbent paper and the more fluid the body absorbed, the greater the absorption. If the ambient temperature drops again to a level at which the margarine re-solidifies, the progression on the absorbent paper stops, to resume in the event of another rise in temperature.

As the absorbent paper is impregnated with the fatty substance, it changes its appearance to assume a transparent oily appearance. If the absorbent paper is previously coloured on one face, the coloration will be visible on each of the faces of the absorbent paper after impregnation with the fatty substance. This coloration may consist of several levels (for example green then red). The progression of the fatty substance on the paper will first show one colour (for example green) then afterwards the following colour (for example red). This second coloration may indicate the limit not to be reached if it is wished to use the product to which the system is subjected.

The device according to the invention employs these physical characteristics: change of state or variation of the viscosity of a product according to the temperature and display by transparency of the absorption of the product by an absorbent body which becomes transparent in contact with the product absorbed.

In this example, the device consists of a housing 1 which is in the shape of a flat strip produced by folding and adhesively securing a sheet of rigid or semi-rigid material such as plastics material or cardboard.

The lower face 2 of the housing which consists of two adjacent folds of the sheet is covered with an adhesive lining 3 (adhesive layer or double-sided adhesive) covered by a protective film 4.

The upper face 5 of the housing 1 comprises at one of its ends an enclosure 6 projecting towards the outside which bounds a space at least partially filled by a product 7 of variable state or viscosity. This space opens into the internal volume of the housing 1 through a hole 8 which can be plugged by an extractable or frangible cover. The cover here consists of a tongue 9 of impermeable material, slidably mounted inside the housing 1 and one end of which emerges through a slot left free at the end of said housing 1. When it is not produced in a transparent material, the upper face 5 includes a series of holes 10 (at least two) which are arranged along the longitudinal axis of the housing 1.

In addition, the housing 1 contains a strip of porous material 11 which extends over its entire length, passing opposite the aforesaid holes 10 and beneath the tongue 9 which constitutes the aforesaid cover.

The strip 11, which may consist for example of absorbent paper or of a fluorocarbonated porous plastics material (for example of polytetrafluorethylene or the like) has the property of being initially opaque and of becoming transparent when it is impregnated with the aforesaid material 7. Thus, when it is transparent, it makes it possible to view through the holes 10 patterns printed either on the lower face of the strip 11 or on the portion of the lower face 2 of the housing 1 in contact with said strip 11.

The operation of the device described above is as follows:

Initially, before use, the tongue 9 is placed so as to plug the hole 8, so that the material 7 contained in the enclosure 6 cannot reach the strip 11, irrespective of the ambient temperature.

To monitor the temperature of an object, the operator removes the protective film 4 to fix the housing 1 onto the object, the temperature of which is less than or equal to the predetermined temperature termed critical.

After the housing 1 has stabilised at the temperature of the object, the operator pulls on the tongue 9 so as to start the monitoring. At this temperature the material 7, solidified, remains in contact with the strip 11 without impregnating it. The strip 11 remains opaque and masks the printed patterns located opposite the holes 10.

On the other hand, when the temperature rises above the critical temperature, the material 7 becomes sufficiently fluid to penetrate into the pores of the strip 11 and progressively impregnate it. As this impregnation progresses, the strip becomes transparent and this transparency spreads from one end to the other, at a predetermined speed and at the end of a predetermined period of time which depend on the absorbency of the strip 11 and on the surface tension of the material 7. In the course of this spread, the patterns located opposite the holes 10 become visible and provide a quantitative indication of duration and intensity of the exposure of the object to a temperature above the critical temperature.

This indication will of course make it possible to ascertain whether the object has been maintained at the preservation temperature and, if not, whether the object is usable or not. The irreversibility of this indication enables any possibility of fraud to be eliminated.

The invention is not of course limited to the embodiment described above.

Thus, the device could for example be in the shape of a self-adhesive label comprising two coaxial disks $D_1$, $D_2$ placed next to each other, that is to say:

a support disk $D_2$ having in its centre a domed shape FB, the concave portion of which is provided with areas of roughness AS, the lower face of the disk carrying an annular adhesive coating RA covered by a protective film FP, an upper disk $D_1$, made of transparent material, configured so as to bound, with the support disk $D_2$, a coaxial central enclosure EC, from which starts a spiral conduit CS constituting the aforesaid propagation space.

The central enclosure EC is intended to receive a material $M_1$ changing state and/or viscosity according to the temperature and having either surfactant properties suitable for spreading by capillary action, or solvent properties, or having chemical properties suitable for bringing about the progressive attack of an appropriate material.

The spiral conduit CS itself, depending on the nature of the material contained in the enclosure, may contain a porous and/or powdery material, a soluble material, and/or a chemically attackable material.

Before use, the material $M_1$ will be hermetically confined in the enclosure by means of a frangible cover OF, the breakage of which may be brought about by the areas of roughness AS, as a result of pressure exerted on the domed shape FB. In the case of a chemical attack, the portion of the material attacked, which is dissolved, then allows the patterns printed on the support disk to appear.

This solution has the advantage of being able to use low viscosity liquids (for example glycolated water or an acid solution) as the material changing state.

As mentioned previously, the use of a material becoming transparent in contact with the material which changes state according to the temperature is not indispensable.

In fact, as illustrated in FIG. 6, it is sufficient to provide a laminar propagation space EL bounded on one side by a smooth face FL which can carry patterns, for example coloured patterns and, on the other side, a wall of transparent material having a frosted face FD. In fact, initially, the presence of the frosted face prevents viewing of the smooth face, viewing being made possible only by the presence of the liquid spreading in the laminar space EL.

FIG. 7 shows another alternative embodiment of the invention employing a flat housing 1', one end of which is provided with an assembly consisting of enclosure EC/frangible cover OF/domed shape FB provided with areas of roughness AS, similar to that in FIGS. 4 and 5.

In addition, the housing 1' bounds a propagation space EP containing a material MA chemically attackable by the liquid L contained in the enclosure EC. As the material MA is attacked, the liquid L uncovers a pattern printed on the lower face FI of the housing 1'.

In the examples described above, in order to secure the transport and preservation of the product contained in the enclosure, the latter may contain an absorbent material impregnated with product.

According to another alternative embodiment of the device according to FIGS. 1 to 3, the tongue which plugs the enclosure may be integral with the porous strip and prolong it on one side.

In this case, pulling on the tongue will allow the strip to be brought into contact with the material contained in the enclosure as shown in FIG. 1B.

According to another variant, the strip itself, without the use of a tongue, may be movable within the housing so as to be able to adopt two positions, that is to say:

an initial position in which it is spaced away from the enclosure and is not in contact with the material, a use position in which, by the effect of an action of the operator, the strip is brought into contact with the material.

In certain cases the feeding of the strip of porous material contained in the enclosure may be effected by means of a thread of porous material serving to regulate the rate of flow. This solution is suitable in particular for fluids having a low viscosity.

The housing may of course be enveloped in an impermeable transparent sleeve so as to avoid any degradation of the device due especially to moisture.

In addition, there is a housing according to FIGS. 8 and 9, including at least one level of detection of when the temperature is exceeded, so as to know precisely for how long and to what extent the temperature has been exceeded. The housing may also be integral with a recorder thus indicating the day and hour at which the temperature was exceeded.

EXAMPLE 1

An assembly of four identical detection devices A.B.C.D. (FIGS. 8 A and B) is produced according to FIGS. 1–7. Each device is programmed such that A. begins its progression when the temperature exceeds 4° C., B. when the temperature exceeds 6° C., C. when the temperature exceeds 8° C., and D. when the temperature exceeds 10° C. This example is intended above all for monitoring particularly sensitive products which cannot withstand wide temperature variations, and more precisely in our example, which must be stored at 4° C. and never exceed 8° C. We therefore attached the product to be monitored to a temperature sensor and we timed the instances when the temperature was exceeded which were thus recorded, taking into account the influence of the temperature on the product, during the different operations of handling the product. We are able to determine that it was exposed for 5 hrs 30 mins to a temperature above 4° C., for 2 hrs 40 mins to a temperature above 6° C., for 1 hour to a temperature above 8° C. and for 10 minutes to a temperature above 10° C. We are able to deduce from this reading that the product which we have just checked could, if we had employed only a single level of control, be considered as GOOD, since the sensor would only have indicated that the acceptable temperature was exceeded for 5 hrs 30 mins. Since the product was classed as very sensitive, we placed our device at four levels of control and we can state without ambiguity that the product, following this handling, is unsuitable for consumption and could even be dangerous.

INTERPRETATION of time when temperature was exceeded of the example in FIG. 9 re. tracking of a product unable to withstand a temperature variation even of short duration

| Temperatures not to be exceeded | 4° C. | 5° C. | 6° C. | 7° C. | 8° C. | 9° C. | 10° C. | 11° C. |
|---|---|---|---|---|---|---|---|---|
| | ******************************** | | | | | | | |
| Levels of control | 1 | | 2 | | 3 | | 4 | |
| Temperature | above 4° C. | | above 6° C. | | above 8° C. | | above 10° C. | |
| Duration | 5 hrs 30 min | | 2 hrs 40 min | | 1 hour | | 10 mins | |
| Product looks good | xxxxxxxxxxx | | | | | | | |
| Consumable | | | xxxxxxxxx | | | | | |
| Danger for product | | | | | xxxxxxxxx | | | |
| Destroy | | | | | | | | XXXXXXXX |

If we had only one control level for a temperature above 4° C. this product would be GOOD
in the present case we can conclude that the product was altered for 1 hour and rendered unsuitable for consumption during the peak at more than 10° C. The product is therefore BAD

What is claimed is:

1. A detector for detecting and measuring the exposure of an object to a predetermined temperature, said detector comprising:
   a substantially flat housing, said housing having a lower face and an upper face, said faces defining a propagation space located between said faces, said upper face being one of transparent and having holes therein;
   an enclosure operatively associated with said propagation space;
   a temperature responsive substance disposed in said enclosure, said substance changing states at a predetermined temperature;
   a porous opaque strip disposed in said propagation space, said strip becoming transparent when impregnated with said substance, said strip movable within said propagation space between first, non-enabled, position and a second, enabled, position; and
   a movable member secured to said porous strip, said porous strip selectively movable from said first non-enabled position preventing contact of said porous strip with said temperature responsive substance, to said second enabled position permitting contact of said porous strip with said temperature responsive substance, said enclosure enabled to communicate with said propagation space, whereby, when so enabled, said substance, upon changing states, impregnates a portion of said porous strip by capillary action at a predetermined speed and causes the impregnated portion of said strip to become transparent to thereby provide a quantitative indication of the duration and exposure of the detector to a temperature above said predetermined temperature.

2. The detector according to claim 1 wherein a pattern is provided on one of a lower face of said porous strip and the lower face of said housing.

3. The detector according to claim 1 wherein said housing comprises a sheet of relatively rigid material adhesively secured to a protective film.

4. The detector according to claim 1 wherein said porous strip comprises one of a powdery material, chalk, absorbent paper, and a strip of fluorocarbonated material.

5. The detector according to claim 1 wherein said enclosure includes an opening disposed between said enclosure and said propagation space.

6. The detector according to claim 1 further comprising means for securing said lower face to an object whose temperature exposure is to be monitored and detected.

7. The detector according to claim 1 wherein said upper face comprises a transparent disk and said lower face comprises a support disk, a dome-shaped portion of said support disk disposed centrally of said support disk, and wherein said propagation space comprises a spiral conduit.

8. The detector according to claim 1 wherein said movable member comprises a strip of impermeable material.

9. The detector according to claim 8 wherein said movable member is slidably disposed within said housing, said movable member secured to said porous strip and extending out of said propagation space.

10. A detector for detecting and measuring the exposure of an object to a predetermined temperature, said detector comprising:
    a housing, said housing having a lower face and an upper face, said faces defining a propagation space located between said faces, said upper face being frosted and said lower face including a pattern;
    an enclosure operatively associated with said propagation space;
    a temperature responsive substance disposed in said enclosure, said substance changing states at a predetermined temperature; and
    a movable member which is selectively movable from a first non-enabled position preventing movement of said temperature responsive substance into said propagation space, to a second enabled position permitting movement of said temperature responsive substance into said propagation space, said enclosure enabled to communicate with said propagation space, whereby, when so enabled, said temperature responsive substance, upon changing states, enters said propagation space at a predetermined speed and enables said frosted face to become transparent to thereby provide a quantitative indication of the duration and exposure of the detector to a temperature above said predetermined temperature.

11. The detector according to claim 10 wherein a pattern is provided on the lower face of said housing.

* * * * *